(12) United States Patent
Yang et al.

(10) Patent No.: US 9,310,797 B2
(45) Date of Patent: Apr. 12, 2016

(54) SINGLE DEGREE OF FREEDOM VIBRATION ISOLATING DEVICE OF LINEAR MOTOR AND MOTION CONTROL METHOD THEREOF

(71) Applicant: TSINGHUA UNIVERSITY, Beijing (CN)

(72) Inventors: Kaiming Yang, Beijing (CN); Yu Zhu, Beijing (CN); Dongdong Yu, Beijing (CN); Rong Cheng, Beijing (CN); Ming Zhang, Beijing (CN); Xin Li, Beijing (CN); Haihua Mu, Beijing (CN); Jinchun Hu, Beijing (CN); Dengfeng Xu, Beijing (CN); Wensheng Yin, Beijing (CN); Guofeng Ji, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 31 days.

(21) Appl. No.: 14/395,471

(22) PCT Filed: Apr. 15, 2013

(86) PCT No.: PCT/CN2013/074194
§ 371 (c)(1),
(2) Date: Oct. 17, 2014

(87) PCT Pub. No.: WO2013/155947
PCT Pub. Date: Oct. 24, 2013

(65) Prior Publication Data
US 2015/0077032 A1 Mar. 19, 2015

(30) Foreign Application Priority Data
Apr. 19, 2012 (CN) .......................... 2012 1 0116967

(51) Int. Cl.
G05B 5/01 (2006.01)
G05B 11/00 (2006.01)
G05B 19/18 (2006.01)
H02P 25/06 (2006.01)

(52) U.S. Cl.
CPC ................ *G05B 19/18* (2013.01); *H02P 25/06* (2013.01); *G05B 2219/41117* (2013.01)

(58) Field of Classification Search
CPC ....................... A61H 23/02; A61H 2201/5097
USPC ........................................................ 318/611
See application file for complete search history.

(56) References Cited

U.S. PATENT DOCUMENTS 6,359,679 B1  3/2002  Ito et al.

FOREIGN PATENT DOCUMENTS

| CN | 1595299 A | 3/2005 |
| CN | 101290477 A | 10/2008 |
| CN | 102647143 A | 8/2012 |
| JP | 10-12538 A | 1/1998 |

OTHER PUBLICATIONS

International Search Report for PCT/CN2013/074194 filed on Apr. 15, 2013.

*Primary Examiner* — Bentsu Ro
*Assistant Examiner* — Devon Joseph

(57) ABSTRACT

A single degree of freedom vibration isolating device of a linear motor and a motion control method thereof. The vibration isolating device comprises a balance block, an anti-drifting driving unit, and a control unit. An upper surface of the balance block is connected to a stator of the linear motor, and a lower surface of the balance block is connected to a base. The anti-drifting driving unit is connected to the balance block for controlling the position of the balance block. Provided two motion control methods: inputting a second grating ruler signal to the control unit as feedback to perform variable stiffness and nonlinear control on the balance block; inputting a first and a second grating ruler signal to the control unit as feedback to obtain resultant centroid displacement signals of the rotor and the balance block to perform nonlinear anti-drifting control on the balance block.

6 Claims, 5 Drawing Sheets

SINGLE DEGREE OF FREEDOM VIBRATION ISOLATING DEVICE OF LINEAR MOTOR AND MOTION CONTROL METHOD THEREOF

The present invention relates to a unidirectional vibration isolating device of a linear motor and a movement control method thereof, which belongs to the technical field of semiconductor equipment.

BACKGROUND

The scanning process of a lithography machine platform comprises an accelerating stage, a scanning stage and a decelerating stage. The time period from the end of the accelerating stage to the beginning of the scanning stage is referred to as a platform adjusting time, which directly affects the productivity of the lithography machine. During the accelerating stage, the linear motor of the platform will generate large reactive force on the stator of the linear motor, so, when the stator of the linear motor is fixed to the base, the base will vibrate due to the reactive force, and the vibration will coupled with the measurement system on the base, increasing the adjustment time of the system, restricting the work efficiency of the lithography machine.

SUMMARY

It is an objective of the present invention to provide a vibration isolating device of a linear motor for isolating single degree of freedom vibration and a movement control method thereof, which is capable of ensuring unidirectional drift of the balance block will not occur when the linear motor works, and thus avoid applying large reactive force to the base.

The technical solutions of the present invention are described as below.

The vibration isolating device comprises a balance block moving along X axis, an anti-drifting driving unit and a control unit.

The upper surface of the balance block is fixedly connected to the stator of the linear motor, the lower surface of the balance block is connected to the base through a first air bearing, a first grating viler is mounted on one side of the balance block, the grating stripes of the first grating ruler are arranged along the direction of X axis, and a first grating ruler reading head corresponding to the first grating ruler is mounted on the rotor of the linear motor.

The anti-drifting driving unit comprises an anti-drifting linear motor, a grating ruler and a guide rail; the guide rail is fixedly connected to the rotor of the anti-drifting linear motor, one end of the guide rail is connected to the balance block through the second air bearing in YZ plane, one side of the guide rail in XY plane is connected to the stator of the anti-drifting linear motor through a second air bearing, and one side of the guide rail in XZ plane is connected to the stator of the anti-drifting linear motor through a second air bearing; the stator of the anti-drifting linear motor is fixedly connected to the base, a second grating ruler is mounted on one side of the guide rail, the grating stripes of the second grating ruler are arranged along the direction of X axis, and a second grating ruler reading head corresponding to the second grating ruler is mounted on the stator of the anti-drifting linear motor;

The control unit comprises an industrial personal computer storing a control program, a grating counter card, a DA card and a driver, the grating counter card collect signals of the first grating ruler and the second grating ruler and respectively input the collected two signals into the industrial personal computer, then industrial personal computer control the anti-drifting linear motor using the two grating signals as position feedback signals, and control instructions are output to the driver through the D/A card.

The first air bearing is a vacuum preloaded bearing, a permanent magnet preloaded bearing or a gravity preloaded bearing; the second air bearing is a vacuum preloaded bearing or a permanent magnet preloaded bearing.

There are two methods for controlling the vibration isolating device.

The first technical solution comprises the following steps:

(1) at the beginning of a servo cycle, setting the displacement of the balance block as zero, collecting signals of the second grating ruler through the grating counter card to obtain the displacement signal showing displacement of the balance block relative to the base, and inputting the displacement signal into the industrial personal computer as a position feedback signal to obtain the displacement deviation $e_b$ of the balance block;

(2) processing the displacement deviation $e_b$ using a first nonlinear element, and the first nonlinear element is expressed as follow:

$$\phi_1(\cdot) = a_{|p} + b_p\left[1 - \frac{2}{e^{c_p \cdot e_b} + e^{-c_p \cdot e_b}}\right]$$

wherein $e_b$ is the displacement deviation of the balance block, $a_p$ is an offset coefficient, $b_p$ is an amplification coefficient, and $c_p$ is a climbing speed coefficient;

(3) processing the output signal of the first nonlinear element by the linear controller of the balance block to obtain the control instructions for controlling the anti-drifting motor, the control instructions are converted from digital to analog by the D/A card, and then inputted into the driver which proportionally outputs electrical current to drive the anti-drifting motor; repeating steps (1) to (3) in the next servo cycle, thereby driving the balance block towards the presetting position.

The second technical solution comprises the following steps:

(1) at the beginning of a servo cycle, setting the displacement of the resultant centroid of the linear motor and the balance block as zero, then collecting signals of the first grating ruler and the second grating ruler through the grating counter card, respectively, to obtain the displacement signal showing displacement of the rotor of the linear motor relative to the balance block and the displacement signal showing displacement of the balance block relative to the base, and the displacement of the resultant centroid of the linear motor and the balance block can be calculated from the two displacement and are used as feedback signals to obtain the displacement deviation $e_b$ of the resultant centroid;

(2) processing the displacement deviation $e_b$ using a second nonlinear element, and the second nonlinear element $\emptyset_2$ is expressed as follow:

$$\phi_2(\cdot) = \begin{cases} a\left(1 - \frac{\delta}{|e_b|}\right), & |e_b| > \delta \\ 0, & |e_b| \le \delta \end{cases}$$

wherein a is a nonlinear gain coefficient, $e_b$ is the displacement deviation of the resultant centroid, and $\delta$ is a presetting threshold;

(3) processing the output signal of the second nonlinear element by the linear controller of the balance block to obtain the control instructions for the anti-drifting motor, the control instructions are converted from digital to analog by the D/A card, and then inputted into the driver which proportionally outputs electrical current to drive the anti-drifting motor; repeating steps (1) to (3) in the next servo cycle, thereby driving the balance block towards the presetting position.

The linear controller of the balance block is a PID controller, a lead-lag controller or a robust controller The advantages and outstanding technical effects of the present invention line in: the vibration isolating device provided by the present invention is capable of effectively eliminating the effect of the reactive force which is generated by the linear motor on the base, and the anti-drifting movement control method is capable of ensuring unidirectional drift of the balance block will not occur when the linear motor works, and avoiding applying large reactive force to the base.

IN THE DRAWINGS

1—base;
2a—first grating ruler reading head;
2b—first grating ruler;
4a—first air bearing;
4b—second air bearing;
4c—third air bearing;
4d—forth air bearing;
5a—second grating ruler reading head;
5b—second grating ruler;
7—stator of the anti-drifting linear motor;
9—rotor of the anti-drifting linear motor;
10—guide rail;
11—balance block;
12—stator of the linear motor;
13—rotor of the linear motor;
$\varnothing_1$—first nonlinear element;
$\varnothing_2$—second nonlinear element.

DETAILED DESCRIPTION

The principle, structure and working process of the present invention is further explained in combination with the accompanying drawings.

Figure 3:
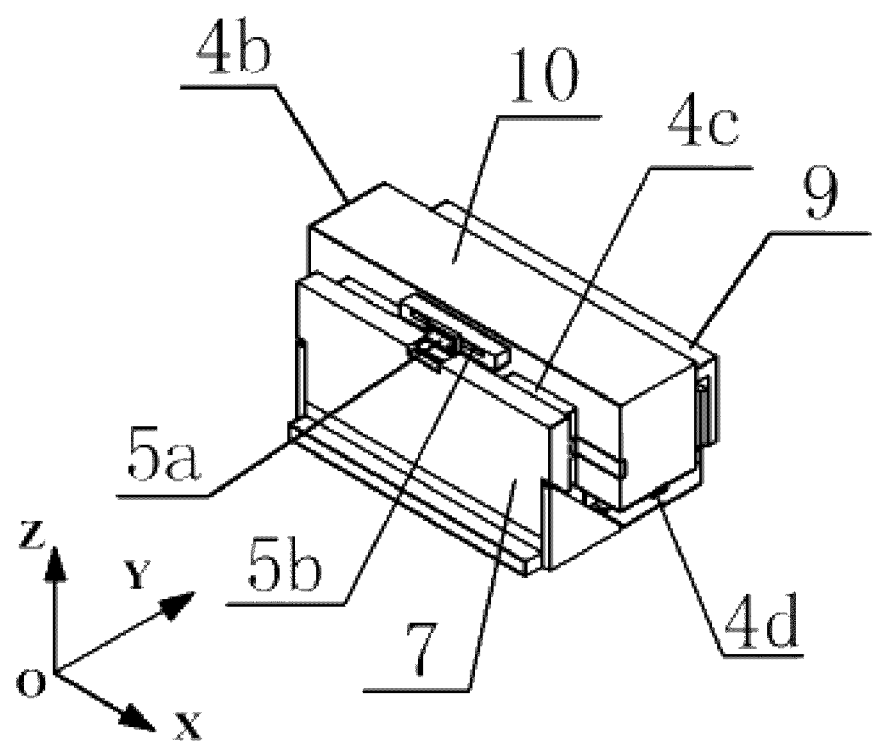
FIG. 3 is a schematic view (isometric view) illustrating the principle of structure of the anti-drifting driving unit of the present invention.

In order to avoid the reactive force generated by a linear motor applying to the base, a balance block is provided in a platform. The upper surface of the balance block is fixedly connected to the stator of the linear motor, and the lower surface of the balance block is connected to the base through an air bearing, so that the balance block can move on the base without friction. When the linear motor generates thrust, the balance block may move proportionally in the opposite direction due to the reactive force. In an ideal situation, when the linear motor move back to the initial position during reciprocating movement, the balance block will also back to the initial position correspondingly. However, due to factors such as machining errors, mounting errors, external interferences and the like, the position drift of the balance block will occur during the movements. In order to control the position of the balance block such that the balance block will not move beyond the presetting stroke, an anti-drifting driving unit is designed, as illustrated in FIG. 3. The anti-drifting driving unit should not only ensure that unidirectional drift of the balance block will not, but also minimize the reactive force generated by the linear motor which is transmitted to the base. Therefore, a movement control method of the vibration isolating device is further provided by the present invention.

Figure 1:
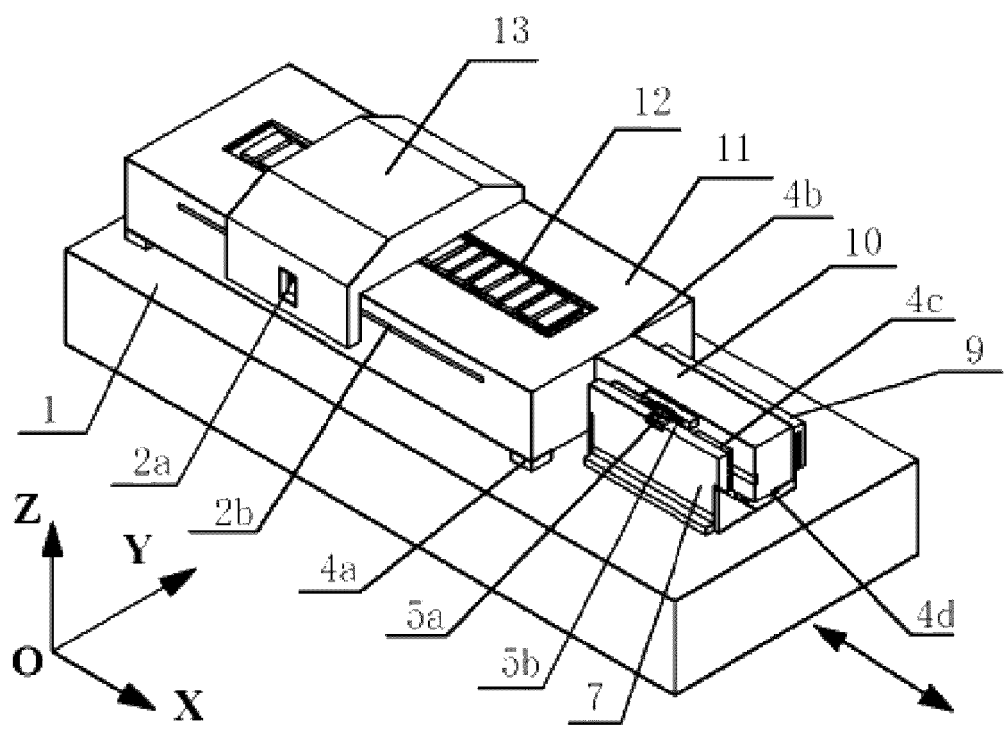
FIG. 1 is a schematic view (isometric view) illustrating the principle of structure of the vibration isolating device of the present invention.
Figure 2:
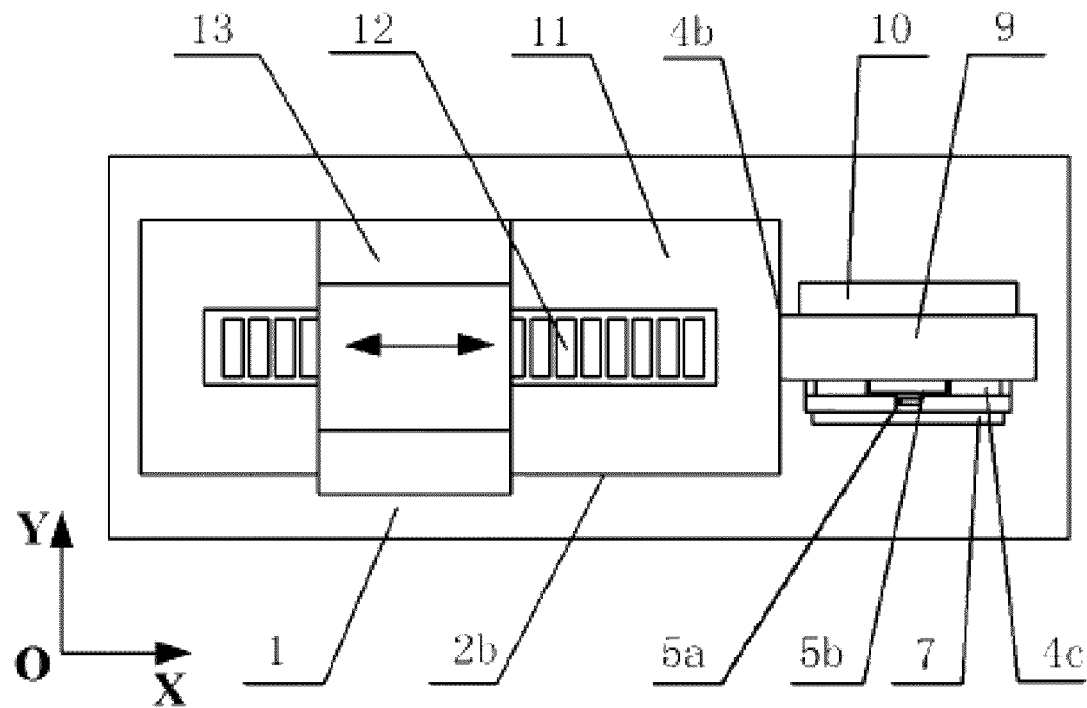
FIG. 2 is a top view illustrating the vibration isolating device of the present invention.

FIGS. 1 and 2 are schematic views illustrating the principle of structure of the vibration isolating device of the present invention. The linear motor of the present comprises a rotor 13 of the linear motor and a stator 12 of the linear motor. The vibration isolating device comprises a balance block 11 which can move in the direction of X axis, an anti-drifting driving unit and a control unit.

The upper surface of the balance block 11 is fixedly connected to stator 12 of the linear motor, and the lower surface of the balance block 11 is connected to the base 1 through a first air bearing 4a so that the balance block 11 can move on the base 1 without damping. When rotor 13 of the linear motor moves in the positive direction of Y axis, the reactive force applied to stator 12 of the linear motor will push the balance block 11 in the negative direction of Y axis, and both movements follows the momentum conservation law. A first grating ruler 2b is mounted on one side of the balance block 11, the grating stripes of the first grating ruler 2b are arranged along the direction of X axis, and a first grating ruler reading head 2a corresponding to the first grating ruler 2b is mounted on rotor 12 of the linear motor for measuring the displacement of rotor 13 of the linear motor relative to the balance block 11.

Figure 4:
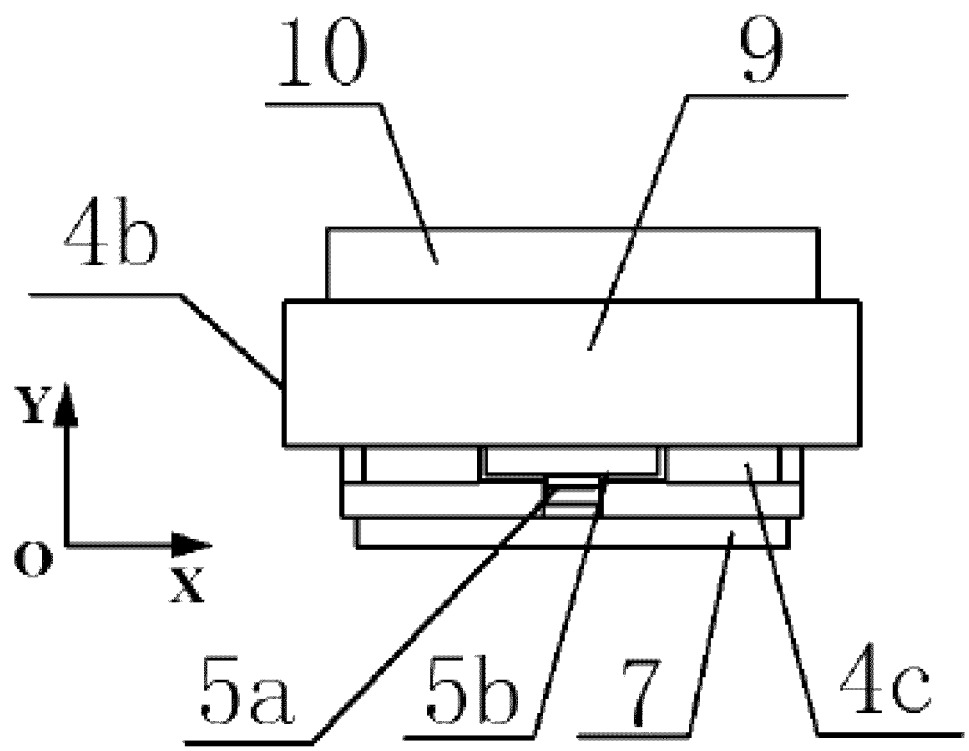
FIG. 4 is a top view illustrating the anti-drifting driving unit of the present invention.

FIG. 3 is a schematic view (isometric view) illustrating the structure of the anti-drifting driving unit, and FIG. 4 is a top view illustrating the anti-drifting driving unit. The anti-drifting driving unit comprises an anti-drifting linear motor, a grating ruler and a guide rail 10; the guide rail 10 is fixedly connected to rotor 9 of the anti-drifting linear motor, one end of the guide rail 10 is connected to the balance block 11 through the second air bearing 4b in YZ plane, one side of the guide rail 10 in XY plane is connected to the stator 7 of the anti-drifting linear motor through a third air bearing 4c, and one side of the guide rail 10 in XZ plane is connected to the stator 7 of the anti-drifting linear motor through a forth air bearing 4d; the stator 7 of the anti-drifting linear motor is fixedly connected to the base 1, a second grating ruler 5b is mounted on one side of the guide rail 10, the grating stripes of the second grating ruler 5b are arranged along the direction of X axis, and a second grating ruler reading head 5a corresponding to the second grating ruler 5b is mounted on the stator 7 of the anti-drifting linear motor. As the guide rail 10 is connected to the balance block 11, the second grating ruler 5b measures the displacement of the balance block 11 relative to the base 1. When the anti-drifting motor works, the guide rail 10 is driven by rotor 9 of the anti-drifting, and the guide rail 10 then pushes the balance block 11 to move to prevent the balance block 11 from unidirectional drift. Meanwhile, the anti-drifting linear motor will generate reactive force on the stator 7 of the anti-drifting linear motor, and then the reactive force is transmitted to the base 1, thus the base 1 vibrates.

Figure 5:
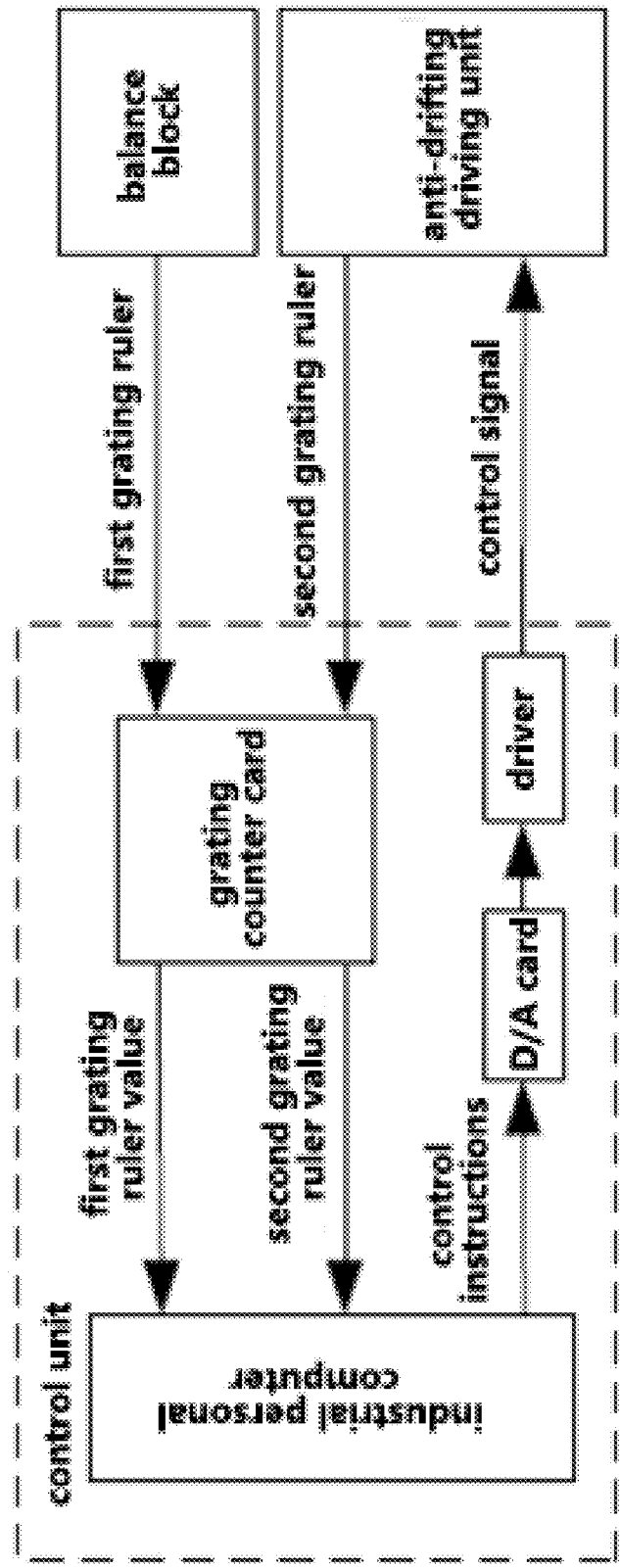
FIG. 5 is a functional block diagram illustrating the vibration isolating device of the present invention.

FIG. 5 is a functional block diagram illustrating the vibration isolating device of the present invention. The control unit comprises an industrial personal computer storing a control program, a grating counter card, a DA card and a driver. Signals of the first grating ruler 2b and the second grating ruler 5b are collected by the control unit through the grating counter card, respectively. The first grating ruler 2b measures the displacement of rotor 13 of the linear motor relative to the balance block 11, and the second grating ruler 5b measures the displacement of the balance block 11 relative to the base 1. The control unit controls the anti-drifting linear motor by using the obtained two grating signals as feedback signals. The control program is executed in the industrial personal computer, which generates displacement deviation when receives displacement feedback signal, and then the displacement deviation is processed to generate control instructions. The control instructions are output to the driver through the DA card, and the control instructions drive the anti-drifting linear motor to get the balance block reach assigned position.

Figure 6:
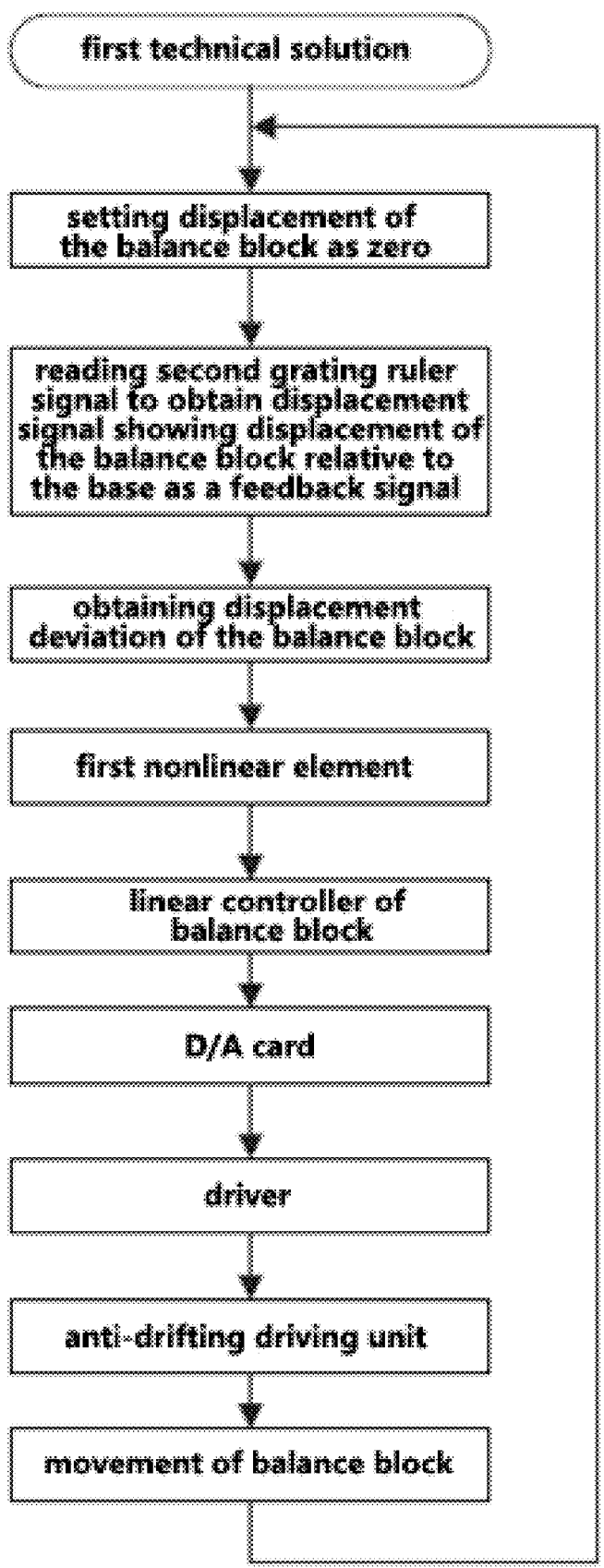
FIG. 6 is a program flow diagram illustrating the first movement control method for the vibration isolating device of the present invention.

FIG. 6 is a program flow diagram illustrating the first movement control method for the vibration isolating device of the present invention. The method comprises the following steps:

(1) at the beginning of a servo cycle, setting the displacement of the balance block as zero, collecting signals of the second grating ruler through the grating counter card to obtain the displacement signal showing displacement of the balance block relative to the base, and inputting the displacement signal into the industrial personal computer as a position feedback signal to obtain the displacement deviation $e_b$ of the balance block;

(2) processing the displacement deviation $e_b$ using a first nonlinear element, and the first nonlinear element is expressed as follow:

$$\phi_1(\cdot) = a_p + b_p\left[1 - \frac{2}{e^{c_p \cdot e_b} + e^{-c_p \cdot e_b}}\right]$$

wherein $e_b$ is the displacement deviation of the balance block, $a_p$ is an offset coefficient, $b_p$ is an amplification coefficient, $c_p$ is a climbing speed coefficient, the output of the first nonlinear element increases as the control deviation of the balance block $e_b$ increases, and when the control deviation of the balance block $e_b$ is smaller, the output of the first nonlinear element is nearly zero;

(3) processing the output signal of the first nonlinear element by the linear controller of the balance block to obtain the control instructions for controlling the anti-drifting motor, the control instructions are converted from digital into analog or from analog into digital by the DA card, and then inputted into the driver which proportionally outputs electrical current to drive the anti-drifting motor; repeating steps (1) to (3) in the next servo cycle, thereby driving the balance block towards the presetting position.

The linear controller of the balance block is a PID controller, a lead-lag controller or a robust controller enabling the equivalent stiffness of the closed-loop controller of the balance block increases as the displacement deviation increases, along with the second nonlinear element.

Figure 7:
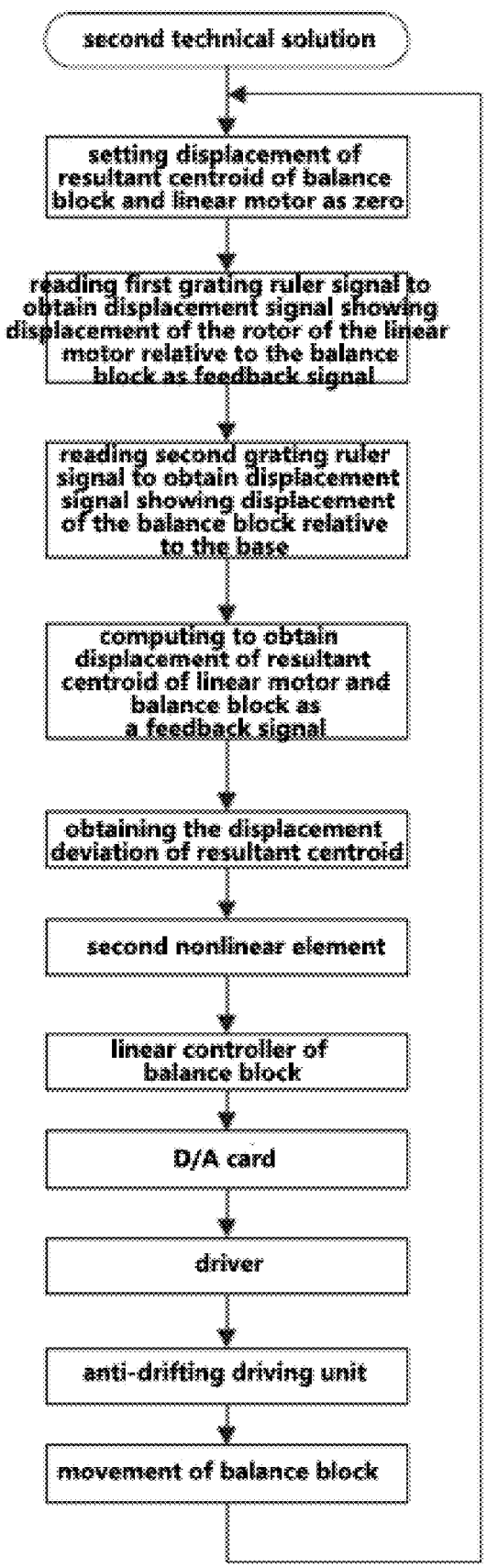
FIG. 7 is a program flow diagram illustrating the second movement control method for the vibration isolating device of the present invention.

FIG. 7 is a program flow diagram illustrating the second movement control method for the vibration isolating device. The method comprises the following steps:

(1) at the beginning of a servo cycle, setting the displacement of the resultant centroid of the linear motor and the balance block as zero, then collecting signals of the first grating ruler and the second grating ruler through the grating counter card, respectively, to obtain the displacement signal showing displacement of the rotor of the linear motor relative to the balance block and the displacement signal showing displacement of the balance block relative to the base, and the displacement of the resultant centroid of the linear motor and the balance block can be calculated from the two displacement and are used as feedback signals to obtain the displacement deviation $e_b$ of the resultant centroid, wherein the displacement of the resultant centroid is calculated by the following expression:

$$x_{cog} = \frac{m_c(x_c + x_b) + m_b \cdot x_b}{m_b + m_c}$$

wherein $x_{cog}$ is the displacement of the resultant centroid, $x_c$ is the displacement of the rotor of the linear motor relative to the balance block, $x_b$ is the displacement of the balance block relative to the base, $m_c$ is the mass of the rotor of the linear motor, and $m_b$ is the total mass of the stator of the linear motor, the balance block and the guide rail;

(2) processing the displacement deviation $e_b$ using a second nonlinear element, and the second nonlinear element $\varnothing_2$ is expressed as follow:

$$\phi_2(\cdot) = \begin{cases} a\left(1 - \frac{\delta}{|e_b|}\right), & |e_b| > \delta \\ 0, & |e_b| \leq \delta \end{cases}$$

wherein a is a nonlinear gain coefficient, $e_b$ is the displacement deviation of resultant centroid, and $\delta$ is the presetting threshold, in an ideal situation, when the displacement of the resultant centroid is larger than the presetting threshold, the controller generates control signal to drive the anti-drifting linear motor, or otherwise, the control output is zero;

(3) processing the output signal of the second nonlinear element by the linear controller of the balance block to obtain the control instructions for the anti-drifting motor, the control instructions are converted from digital to analog by the DA card, and then inputted into the driver which proportionally outputs electrical current to drive the anti-drifting motor; repeating steps (1) to (3) in the next servo cycle, thereby driving the balance block towards the presetting position.

The linear controller of the balance block is a PID controller, a lead-lag controller or a robust controller which implements nonlinearly control based on displacement of the resultant centroid along with the second nonlinear element to prevent the balance block from drifting.

The invention claimed is:

1. A vibration isolating device of a linear motor for isolating single degree of freedom vibration, which linear motor comprises a rotor (13) and a stator (12), characterized in that, the vibration isolating device comprises a balance block (11) moving along X axis, an anti-drifting driving unit and a control unit;

the upper surface of the balance block (11) is fixedly connected to the stator (12) of the linear motor, the lower surface of the balance block (11) is connected to the base (1) through a first air bearing (4a), a first grating ruler (2b) is mounted on one side of the balance block (11), the grating stripes of the first grating ruler (2b) are arranged along the direction of X axis, and a first grating ruler reading head (2a) corresponding to the first grating ruler (2b) is mounted on the rotor (13) of the linear motor;

the anti-drifting driving unit comprises an anti-drifting linear motor, a grating ruler and a guide rail (10); the guide rail (10) is fixedly connected to the rotor (9) of the anti-drifting linear motor, one end of the guide rail (10) is connected to the balance block (11) through a second air bearing (4b) in YZ plane, one side of the guide rail (10) in XY plane is connected to the stator (7) of the anti-drifting linear motor through a third air bearing (4c), and one side of the guide rail (10) in XZ plane is connected to the stator (7) of the anti-drifting linear motor through a forth air bearing (4d); the stator (7) of the anti-drifting linear motor is fixedly connected to the base (1), a second grating ruler (5b) is mounted on one side of the guide rail (10), the grating stripes of the second grating ruler (5b) are arranged along the direction of X axis, and a second grating ruler reading head (5a) corresponding to the second grating ruler (5b) is mounted on the stator (7) of the anti-drifting linear motor;

the control unit comprises an industrial personal computer storing a control program, a grating counter card, a DA card and a driver; signals of the first grating ruler (2b) and the second grating ruler (5b) are collected and input into the industrial personal computer by the grating counter card, respectively, then the anti-drifting linear motor is controlled by the industrial personal computer by using the signals as position feedback signals, and control instructions are output to the driver through the D/A card.

2. The vibration isolating device of claim 1, characterized in that: the first air bearing (4a) is a vacuum preloaded bearing, a permanent magnet preloaded bearing or a gravity preloaded bearing; and the second air bearing (4b) is a vacuum preloaded bearing or a permanent magnet preloaded bearing.

3. A method for controlling the vibration isolating device of claim 1, characterized in that the method comprises the following steps:
   (1) at the beginning of a servo cycle, setting the displacement of the balance block as zero, collecting signals of the second grating ruler (5b) through the grating counter card to obtain the displacement signal showing displacement of the balance block relative to the base, and inputting the displacement signal into the industrial personal computer as a position feedback signal to obtain the displacement deviation $e_b$ of the balance block;
   (2) processing the displacement deviation $e_b$ using a first nonlinear element, and the first nonlinear element is expressed as follow:

$$\phi_1(\cdot) = a_p + b_p \left[1 - \frac{2}{e^{c_p \cdot e_b} + e^{-c_p \cdot e_b}}\right]$$

wherein $e_b$ is the displacement deviation of the balance block, $a_p$ is an offset coefficient, $b_p$ is an amplification coefficient, and $c_p$ is a climbing speed coefficient;
   (3) processing the output signal of the first nonlinear element by the linear controller of the balance block to obtain the control instructions for controlling the anti-drifting motor, the control instructions are converted from digital into analog by the D/A card, and then inputted into the driver which proportionally outputs electrical current to drive the anti-drifting motor; repeating steps (1) to (3) in the next servo cycle, thereby driving the balance block towards the presetting position.

4. A method for controlling the vibration isolating device of claim 1, characterized in that the method comprises the following steps:
   (1) at the beginning of a servo cycle, setting the displacement of the resultant centroid of the linear motor and the balance block as zero, then collecting signals of the first grating ruler (2b) and the second grating ruler (5b) through the grating counter card, respectively, to obtain the displacement signal showing displacement of the motor rotor relative to the balance block and the displacement signal showing displacement of the balance block relative to the base, and the displacement of the resultant centroid of the linear motor and the balance block is calculated from the two displacements and are used as a feedback signal to obtain the displacement deviation $e_b$ of the resultant centroid;
   (2) processing the displacement deviation $e_b$ using a second nonlinear element, and the second nonlinear element $\emptyset_2$ is expressed by:

$$\phi_2(\cdot) = \begin{cases} a\left(1 - \frac{\delta}{|e_b|}\right), & |e_b| > \delta \\ 0, & |e_b| \leq \delta \end{cases}$$

wherein $a$ is a nonlinear gain coefficient, $e_b$ is the displacement deviation of the resultant centroid, and $\delta$ is the presetting threshold;
   (3) processing the output signal of the second nonlinear element by the linear controller of the balance block to obtain the control instructions for the anti-drifting motor, the control instructions are converted from digital to analog by the D/A card, and then inputted into the driver which proportionally outputs electrical currents to drive the anti-drifting motor; repeating steps (1) to (3) in the next servo cycle, thereby driving the balance block towards the presetting position.

5. The method for controlling the vibration isolating device of claim 3, characterized in that the linear controller of the balance block is a PID controller, a lead-lag controller or a robust controller.

6. The method for controlling the vibration isolating device of claim 4, characterized in that the linear controller of the balance block is a PID controller, a lead-lag controller or a robust controller.

* * * * *